Patented Aug. 30, 1949

2,480,669

UNITED STATES PATENT OFFICE 2,480,669

PROCESS OF PREPARING EXTRUDED GELS

John W. Payne and James M. Johnson, Woodbury, and Ernest A. Bodkin, Pitman, N. J., assignors to Socony-Vacuum Oil Company, Incorporated, a corporation of New York No Drawing. Application April 24, 1946, Serial No. 664,710

5 Claims. (Cl. 252—455)

This invention relates to the preparation of inorganic oxide gelatinous precipitates or hydrogels in a condition suitable for extrusion and, more particularly, is directed to a process for preparing an extruded synthetic inorganic oxide gel composite suitable for use in the promotion of catalytic operations and other applications of adsorbents.

Inorganic oxide gels have, in the past, found wide application as adsorbents, desiccants, catalysts, and suitable surfaces for the deposition thereon of various materials, particularly those of a catalytic nature. Experience has shown that, while such gels may be employed in fragmentary form, they are suitably prepared for use in the above and similar operations in the form of substantially uniform particles. Various means have accordingly been adopted to render a hydrogel into a particle form of desired size and shape. Such means have included principally pelleting and extrusion operations.

The present invention is directed to an improvement in the latter operation and, more specifically, is concerned with the preparation of the hydrogel material to be extruded. According to this invention, a charge suitable for extrusion is prepared by the formation of a hydrogel and thereafter freezing and thawing said hydrogel under conditions of time and temperature such that the resultant granules retain their colloidal structure while releasing a major proportion of the water contained in the porous hydrogel mass, removing the released water from the residual hydrogel granules to give a product characterized by a sufficient degree of plasticity and moisture content so as to properly lubricate the dies of the extrusion apparatus. This procedure has several advantages over the usual processes of extruding hydrogel materials wherein the charge is necessarily kneaded or ball-milled prior to extrusion in order to lend a proper consistency and plasticity to the mass to be extruded. The process of this invention accordingly represents a compact and efficient method of preparing an extrudable mass. The extruded material obtained after drying and tempering is of a homogeneous nature, giving rise to a substantially uniform, consistent, extruded product which has heretofore been absent in the extruded masses prepared by conventional methods.

Although the methods of this invention of preparing a hydrogel charge suitable for extrusion are applicable to the formation of particles from any of the hydrous inorganic metallic oxide hydrogels or silica hydrogel and the dried, extruded product may be employed for any of the uses to which gels are put, a preferable specific embodiment of the present invention comprises an improvement in manufacture of hydrocarbon conversion catalysts. A synthetic inorganic oxide gel composite suitably composed of a major proportion of silica and a minor proportion of one or more hydrous inorganic metallic oxides, upon preparation for extrusion as described above, extrusion, drying and tempering, yielded an excellent hydrocarbon conversion catalyst characterized by a hard, porous structure and a high rate of regeneration.

In the catalytic conversion of hydrocarbon, the catalyst is contacted with hydrocarbon vapors at conversion conditions, for example, 800° F.–1000° F. at atmospheric or greater pressures. The reaction which takes place is essentially a cracking to produce lighter hydrocarbons, but is accompanied by a number of complex side reactions, such as aromatization, polymerization, alkylation, and the like. As a result of these complex reactions, a carbonaceous deposit is laid down on the catalyst which is commonly called coke. The coke tends to seriously impair the catalytic efficiency of the catalyst for the principal reaction and the conversion reaction is therefore suspended after coke, to the extent of a few per cent by weight, has accumulated on the catalyst. The catalytic surface is then regenerated by burning the coke in a stream of oxidizing gas and the catalyst is returned to the conversion stage of the cycle.

During the period of regeneration the catalyst is not being employed for its intended purpose. Accordingly, any means for decreasing the time required for regeneration without appreciably impairing the efficiency of the catalyst is to be highly desired. In accordance with the present method of preparing a synthetic hydrocarbon conversion catalyst, the resulting product has been found to have the desirable activity and hardness characteristics required for a cracking catalyst and, in addition, to possess a greater rate of regeneration as compared with the conventional hydrocarbon conversion catalysts heretofore employed.

A catalyst suitable for promoting the conversion of hydrocarbons is prepared by the method of this invention by formation of the desired hydrogel, freezing and thawing the formed hydrogel, thereby releasing the major proportion of the water contained in the hydrogen, removing the released water from the residual hydrogen and thereafter extruding the residual hydrogel, cutting the extruded material to particles of desired length. The extruded hydrogel particles are then dried to remove the major proportion of water therefrom and tempered at an elevated temperature to yield porous absorbent hard particles of catalyst.

The hydrogel employed in preparing the catalysts of this invention is suitably a composite comprising a major proportion of silica and a minor proportion of a hydrous inorganic metallic oxide, such as alumina, zirconia, titania, beryllia, ceria, thoria, and the like. The hydrogel composite may be prepared by any of the methods commonly employed in the art. A particularly convenient method of preparing the hydrogel starting material for the present process is in the form of spheroidal particles as described in U. S. 2,384,946 to Milton M. Marisic. While the shape and size of hydrogel particles have no bearing on the ultimate properties of the extruded catalyst, the use of spheroidal hydrogel particles is preferred because of the ease of handling them in subsequent operation.

The hydrogel composite consisting of silica and one or more of the above hydrous metallic oxides is suitably base-exchanged with an aqueous solution of an ammonium salt or a metallic salt usually, although not necessarily, a salt of the metal whose oxide is used in preparing the hydrogel. Thus, a silica-alumina hydrogel may be base-exchanged with aluminum sulfate solution to remove zeolitic sodium contained in the hydrogel structure. The hydrogel, after base-exchanging, is thoroughly water-washed.

The base-exchanged, washed hydrogel is then frozen, as by immersion in a cooling bath, preferably of a water-immiscible liquid, such as kerosene, maintained at a temperature below the freezing point of water and preferably below about 25° F. The minimum time required for the freezing operation will vary with the temperature of the freezing bath. Thus, at a temperature of 25° F., the minimum freezing period is about 10 minutes and at a temperature of −15° F. about 2 minutes. It has been found that, in the temperature range of from about 10° F. to about 20° F. and preferably at about 15° F., maximum removal of water from the hydrogel particles is obtained.

After the hydrogel is frozen, it is removed from the freezing bath, drained free of liquid contained in the bath and thawed by heating to a temperature above the freezing point of water. The thawing may be accomplished by simply exposing the frozen hydrogel to room temperature or may be accelerated by heating the hydrogel with suitable means, such as live steam. The freezing and thawing operations cause the hydrogel to disintegrate into small granules and release a major proportion of the water originally present in the freshly formed hydrogel.

The water released from the hydrogel as a result of the thawing is removed by decantation, filtration or other suitable means and the residual hydrogel granules are centrifuged to remove additional liquid adhering to the surfaces.

The water content of the hydrogel granules so treated is an important factor, since the presence of either too much or too little water in the hydrogel charge subjected to extrusion results in poorly shaped, weak gel particles. The physical weakness of the particles appears to be caused by insufficient extrusion pressures in the first case and by the lack of sufficient plasticity and cohesion among the granules of the charge in the second case. The required water content of a hydrogel charge to extrusion depends to some extent on the composition of the gel, but will generally be between about 60 and about 85 per cent by weight of moisture.

The extrusion can be accomplished by employing either a hydraulic plunger type extruder or a continuous auger type extruder. When the latter is employed it is desirable to mix with the charged hydrogel a lubricant, such as oleic acid, castor oil, etc., to impart satisfactory extruding characteristics to the charge. While the size of the extruded material may be varied over wide extremes, for the present purpose extrusion through a hydraulic extruder with a die having approximately one-quarter inch diameter, openings and cutting the resultant extruded material to particles of desired length, was found to give a convenient and easily handled catalyst charge. The addition of fine graphite and mineral oil in small amounts, not exceeding about 5 and about 8 per cent by weight (on bone dry basis), respectively, to the hydrogel, prior to extrusion, have been found to impart an improvement in the coke-forming and regeneration properties of the resultant catalyst without sensibly affecting its physical hardness. Likewise, other substances which can be intimately mixed with the partially dewatered hydrogel prior to its extrusion, and which can be subsequently eliminated by heating at a temperature not in excess of about 1400° F., can be employed to improve the regeneration characteristics of a catalyst. Thus, finely divided flour, starch, cornmeal, dextrin, locust bean gum, castor oil, oleic acid, and the like, have been incorporated in the hydrogel charge prior to extrusion and have been found to yield a hydrocarbon conversion catalyst of improved regeneration properties.

To produce finished catalyst of satisfactory hardness, extruded hydrogel particles should be dried at a relatively low temperature, using large quantities of humidified air. The preferred procedure of this invention consists in drying the extruded hydrogel with air at a temperature of from about 70° F. to about 150° F., suitably at about 90° F. (dry bulb) and a relative humidity of from about 30 to about 80 per cent, suitably at about 70 per cent. The rate of circulation of air in the drying vessel will generally be between about 50 and about 300 and, preferably, about 100 cubic feet of air per minute per square foot of catalyst cross-sectional area. Under the above preferred conditions, approximately 80 to 85 per cent by weight of water in the hydrogel charged to the drying operation is removed, the time of drying requiring about 10 to 12 hours.

After drying, the extruded particles are further heat treated at temperatures on the order of 1400° F. to impart additional physical hardness to the dried particles. A gradual heat treatment or tempering of the dried particles appears desirable and heat treatment is maintained at the maximum temperature for a period of about 10 hours. The extruded hydrogel particles, upon drying and tempering, shrink to about one-fourth of their original volume and it is thought that this shrinkage largely accounts for the physical hardness of the finished product.

The following examples will serve to illustrate the invention without limiting the same:

*Example 1*

A silica-alumina hydrosol was prepared by mixing 1.00 volume of a solution of sodium silicate containing 157.0 grams of SiO₂ per liter and 1.00 volume of a solution containing 39.79 grams of aluminum sulfate and 30.51 grams of sulfuric acid per liter. The resulting colloidal solution was ejected from a nozzle in the form of globules into a column of gas oil whose depth was about eight feet. The globules of solution fell through the oil and gelled before passing into a layer of water located beneath the oil. The time of gelation for the concentrations and proportions of reactants given above was about 4 seconds. The spheroidal particles of hydrogel were conducted out of the bottom of the column into a stream of water and, on removal from the water, base-exchanged with an aqueous solution of aluminum sulfate and water-washed.

The hydrogen particles were then frozen by immersion in kerosene maintained at a temperature of 15° F. The frozen hydrogen was then drained free of kerosene and thawed by heating with live steam to a temperature above 32° F. Freezing and thawing cause the hydrogel particles to disintegrate into small granules and release about 63 to 67 per cent by weight of water originally present in the freshly formed hydrogel.

The water so released was decanted off and the residual hydrogel granules centrifuged in a basket-type centrifuge for 1½ minutes at about 3300 R. P. M. to give a hydrogel of 75–77 per cent by weight moisture content. An X-ray diffraction analysis of the centrifuged hydrogel revealed that the granules are agglomerates of colloidal particles. The hydrogel was then extruded through a hydraulic extruder having a die of approximately one-quarter inch diameter openings. The resultant spaghetti-like material was cut in particles approximately one-quarter inch long.

The extruded hydrogel particles were dried at a temperature of 90° F. (dry bulb) and 70 per cent relative humidity by circulation of air through a 2-inch bed of the catalyst particles, at a rate of about 100 cubic feet per minute per square foot of catalyst cross-sectional area. The drying time required to reach equilibrium was about 12 hours.

At the end of this time, the resultant dried particles were tempered by heating in an electric furnace at the rate of 1° F. per minute until a temperature of 500° F. was reached and thereafter heating at a rate of 3° F. per minute until a temperature of 1400° F. was reached. The particles were held at this temperature for 10 hours and then permitted to cool, yielding hard, porous particles suitable for use in the catalytic cracking of petroleum hydrocarbons.

Example 2

The procedure of Example 1 was followed except that, prior to the extrusion, 5 per cent by weight of fine graphite was added to the hydrogel charged to the hydraulic extruder. The addition of graphite, as will be shown hereinafter, gave rise to a catalyst having improved regeneration characteristics.

Example 3

The procedure of Example 1 was followed except that, prior to the extrusion, 5 per cent by weight of fine graphite and 6 per cent by weight of a mineral oil were added to the hydrogel charged to the hydraulic extruder. The addition of these materials leads to a catalyst of improved characteristics, as will be shown below.

Example 4

The procedure of Example 1 was followed except that, prior to the extrusion, 5 per cent by weight of graphite and 11 per cent by weight of a 1:3 mixture of methylricinoleate and a mineral oil were added to the hydrogel. The hydrogel charge so prepared was then extruded through an auger-type extruder to give an excellent cracking catalyst after drying and tempering as described above.

The catalysts of the above examples were employed in cracking light East Texas gas oil having an A. P. I. gravity of 36.0° and a boiling range of 418 to 714° F. to gasoline having an end point of 410° F., by passing vapors of said gas oil through the catalyst at 800° F., substantially atmospheric pressure, and at a feed rate of 1.5 volume of liquid oil per volume of catalyst per hour. The percentage conversion to gasoline under the above conditions, together with other initial catalyst activity data and data obtained after a period simulating 4½ months' service of catalyst in each case, were obtained using light East Texas gas oil of the type described. The regeneration index as used herein is a measure of the ease with which a certain definite weight of carbon deposited on it is burned off. The regeneration index of a catalyst is assumed to be 100 when 85 per cent of the carbon deposited upon it is burned off in 33 minutes and 0 when the same weight of carbon is burned off in 168 minutes. For purposes of comparison with the catalyst prepared by the process of this invention, data are also tabulated for a conventional silica-alumina synthetic gel catalyst prepared by the process set forth in the Marisic patent mentioned above. The initial silica-alumina ratio was identical for the conventional silica-alumina gel catalyst and the catalyst employed by the method of Example 1. The activity and regeneration data for the conventional silica-alumina gel catalyst, together with that for the catalysts prepared by the procedure of the present process, are summarized below:

| Method of Catalyst Preparation | Conventional SiO₂-Al₂O₃ Catalyst | Example 1 | Example 2 | Example 3 | Example 4 |
| --- | --- | --- | --- | --- | --- |
| Bulk Density of Fresh Catalysts (g./cc.) | 0.76 | 0.70 | 0.68 | 0.63 | 0.65 |
| Initial Activity Data: | | | | | |
| Gas Gravity | 1.57 | 1.50 | 1.64 | 1.60 | 1.62 |
| Gas, Per Cent Wt. | 9.7 | 13.4 | 13.7 | 11.0 | 11.5 |
| Coke, Per Cent Wt. | 3.9 | 5.7 | 5.5 | 4.4 | 4.3 |
| Gasoline (Per Cent conversion) | 45.7 | 47.1 | 46.4 | 48.1 | 45.4 |
| Properties of Catalysts After a Period Simulating 4½ Months' Service: | | | | | |
| Bulk Density (g./cc.) | 0.79 | 0.75 | 0.70 | 0.66 | |
| Regeneration Index | 88 | 99 | 101 | 106 | 104 |
| Activity Data: | | | | | |
| Gas Gravity | 1.54 | 1.34 | 1.30 | 1.43 | |
| Gas, Per Cent Wt. | 6.6 | 7.0 | 7.4 | 5.8 | |
| Coke, Per Cent Wt. | 2.5 | 3.2 | 3.0 | 2.1 | |
| Gasoline (Per Cent conversion) | 38.0 | 37.7 | 38.7 | 37.8 | |

From the above table, it will be noted that the catalysts prepared by the present process have an increased rate of regeneration as compared with the conventional hydrogel catalyst heretofore employed. This ease of regeneration, as measured by the regeneration index, is further improved by the addition of small amounts of graphite and mineral oil mixtures to the hydrogel charged to the extruder.

While the above examples have illustrated the preparation of an extruded silica-alumina hydrogel catalyst, other inorganic oxide hydrogels may likewise be treated to yield an improved hard catalyst of increased ease of regeneration. Thus, silica-zirconia, silica-thoria, silica-ceria, silica-beryllia, and similar hydrogen composites may be treated in accordance with the process of the present invention. The ratio of silica to hydrous metallic oxide employed may vary over a wide range. Thus, the alumina content of a silica-alumina hydrogel composite to be treated in accordance with the present invention may vary from about 3 per cent to about 18 per cent by weight on a bone dry basis.

Likewise, the present invention contemplates perparation of gelatinous precipitates in a condition suitable for extrusion. For example, a gelatinous precipitate of aluminum hydroxide was obtained by precipitation from a dilute aqueous solution of aluminum sulfate. The water content of the precipitate after the removal of supernatant liquid was about 94 per cent. The gelatinous precipitate thus obtained was frozen in a cold room at −20° F. The frozen mass was then thawed at room temperature and the water thus released from it removed by filtration. At this point the water content of the gelatinous mass was found to be 81.4 per cent. This material was easily extrudable and possessed satisfactory handling characteristic necessary for further processing.

The process of the present invention is preferably carried out in the sequence of steps given. However, satisfactory extruded catalysts of the type described can also be obtained by first freezing freshly formed hydrogel, followed by base-exchanging and washing the resultant granules and further processing in the manner hereinbefore described. The process of this invention, accordingly, is to be given a broad interpretation except as hereinafter defined by the appended claims.

We claim:

1. A method for preparing hard granules of inorganic oxide gel containing a major proportion of silica, which comprises forming a hydrogel comprising a major proportion of silica, freezing said hydrogel at a temperature of about 15° F. by immersion in a water-immiscible cooling liquid, thawing the frozen hydrogel to produce a mass of shrunken hydrogel granules and an aqueous liquid, separating said aqueous liquid from said hydrogel granules, subjecting said granules in substantially the form assumed upon thawing to extrusion through a die and drying the extruded hydrogen.

2. A method of preparing a hydrocarbon conversion catalyst comprising the steps of forming a hydrogen comprising a major proportion of silica and a minor proportion of a hydrous inorganic metallic oxide, freezing said hydrogel without destroying the colloidal structure thereof at a temperature of about 15° F. by immersion in a water-immiscible liquid, thawing the frozen hydrogel to produce a mass of shrunken granules of said hydrogen and an aqueous liquid, separating said aqueous liquid from said hydrogen granules, subjecting said granules in substantially the form assumed upon thawing to extrusion through a die, drying and tempering the extruded material to yield a hard, porous adsorbent product.

3. A method of preparing a hydrocarbon conversion catalyst comprising the steps of forming a hydrogen comprising a major proportion of silica and a minor proportion of alumina, base exchanging the hydrogel with a solution of a salt, the cation of which is capable of replacing zeolitic sodium, water-washing the base exchanged hydrogen, freezing said hydrogen without destroying the colloidal structure thereof at a temperature of about 15° F. by immersion in a water-immiscible liquid, thawing the frozen hydrogel to produce a mass of shrunken granules of said hydrogel and an aqueous liquid, separating said aqueous liquid from said hydrogel granules, subjecting said granules in substantially the form assumed upon thawing to extrusion through a die, drying and tempering the extruded material to yield a hard, porous adsorbent product.

4. A method of preparing a hydrocarbon conversion catalyst comprising the steps of forming a hydrogel comprising a major proportion of silica and a minor proportion of a hydrous inorganic metallic oxide, freezing said hydrogel without destroying the colloidal structure thereof at a temperature of about 15° F. by immersion in a water-immiscible liquid, thawing the frozen hydrogel to produce a mass of shrunken granules of said hydrogel and an aqueous liquid, separating said aqueous liquid from said granules, adding to said granules a small amount, not exceeding about 5 per cent by weight, of graphite, subjecting said granules in substantially the form assumed upon thawing to extrusion through a die, drying and tempering the extruded material.

5. A method of preparing a hydrocarbon conversion catalyst comprising the steps of forming a hydrogel comprising a major proportion of silica and a minor proportion of a hydrous inorganic metallic oxide, freezing said hydrogel without destroying the colloidal structure thereof at a temperature of about 15° F. by immersion in a water-immiscible liquid, thawing the frozen hydrogel to produce a mass of shrunken granules of said hydrogel and an aqueous liquid, separating said aqueous liquid from said granules, adding to said granules a small amount, not exceeding about 5 per cent by weight of graphite, and a small amount, not exceeding about 8 per cent by weight, of mineral oil, subjecting said granules in substantially the form assumed upon thawing to extrusion through a die, drying and tempering the extruded material.

JOHN W. PAYNE.
JAMES M. JOHNSON.
ERNEST A. BODKIN.

REFERENCES CITED

The following references are of record in the file of this patent:

UNITED STATES PATENTS

| Number | Name | Date |
|---|---|---|
| 2,209,492 | Spicer | July 30, 1940 |
| 2,272,301 | Kinneberg et al. | Feb. 10, 1942 |
| 2,278,746 | Sturgeon | Apr. 7, 1942 |
| 2,344,330 | Sturgeon | Mar. 14, 1944 |
| 2,363,231 | Connolly | Nov. 21, 1944 |

Certificate of Correction

Patent No. 2,480,669 August 30, 1949

JOHN W. PAYNE ET AL.

It is hereby certified that errors appear in the printed specification of the above numbered patent requiring correction as follows:

Column 5, line 19, column 7, lines 16, 66 and 69, and column 8, lines 1, 2, 10 and 15 (both occurrences), for the word "hydrogen" read *hydrogel*;

and that the said Letters Patent should be read with these corrections therein that the same may conform to the record of the case in the Patent Office.

Signed and sealed this 31st day of January, A. D. 1950.

[SEAL]

THOMAS F. MURPHY,
*Assistant Commissioner of Patents.*